United States Patent Office 2,937,581
Patented May 24, 1960

2,937,581

ROAD BUILDING METHOD

Jules E. Havelin, 216 Walnut Place, Havertown, Pa., and Frank Kahn, 1865 Edmund Road, Abington, Pa.

No Drawing. Filed June 28, 1957, Ser. No. 668,627

6 Claims. (Cl. 94—22)

This invention relates to a method of making stabilized load-supporting bases, and more particularly relates to a method of improving a stabilized road base composed of lime, fly ash and finely divided soil.

This application is a continuation-in-part of our application, Ser. No. 36,048, filed June 30, 1948, entitled "Hydrated Lime Fly Ash Fine Aggregate," now U.S. Patent No. 2,564,690, issued August 21, 1951, and is also a continuation-in-part of our application Ser. No. 245,652, filed August 18, 1951, now U.S. Patent No. 2,698,252, and is also a continuation-in-part of our co-pending patent application Ser. No. 245,651, filed August 18, 1951, now abandoned. In the aforesaid patents and co-pending application we have disclosed cementitious compositions useful as structural materials, stabilized soils and the like which contain fine aggregate in the form of finely divided sand or other chemically inert aggregate, or soil. Repeated experiments in the laboratory as well as practical applications in the field have demonstrated that, within specific ranges of relative proportions of those ingredients, a mixture having unexpectedly high early compressive strength was obtained.

We have now discovered that unexpected advantages are attained by mixing lime and fly ash in controlled proportions with a finely divided soil having a fineness modulus less than 1.7, compacting the mix, partially setting, then re-working and recompacting the mix, and then setting it completely. Soils having fineness modulus below 1.7 are of such fineness that they are outside the class of material usually referred to as aggregates. The formation of our mixtures changes the engineering properties of the soil at once, converting it to an excellent stabilized material for building load-supporting surfaces such as roads, highways, airfield runways and the like. After curing for an appropriate time, this stabilized material develops advantageous strength characteristics for service as a load-supporting base, but these advantages are greatly enhanced by the method which comprises this invention.

It is an object of this invention to provide a method of improving the ultimate strength of a mixture composed of lime, fly ash and soil.

Another object is to provide a method of making an improved road or other load-supporting base.

Further objects and advantages of the invention will further become apparent hereinafter.

The foregoing and other objects are attained in accordance with this invention by incorporating lime and fly ash into a finely divided soil, said finely divided soil having a fineness modulus less than 1.7, in the presence of moisture, compacting the resulting composition, subjecting the compacted composition to partial setting, breaking the partially-set mix down into a plurality of separate and discrete particles, recompacting the separate and discrete particles, and then completing the setting of the resulting recompacted mix.

The words "lime," "fly ash," "soil," and "fineness modulus" are expressions well known in the art and have been discussed in considerable detail in our aforementioned U.S. Patent No. 2,698,252.

Finely divided materials other than natural soils, which are equivalent to the soils falling within the above defined soil classifications, nevertheless are included with the scope of this invention. These materials include fine sand, stone screenings, slags, gravel screenings, mineral deposits, fine screenings from quarry operations and the like, having fineness modulus below 1.7, as well as other similar soil-like materials all of which are included within the meaning of the term "soils" as used herein.

The relative proportions of the three principal components of the compositions are important, in that a wholly unexpected peak is attained, when certain soil characteristics are plotted against the relative proportions of fly ash and lime in the mix, such peak being of the same general character as that represented in Fig. 2 of our aforementioned Patent No. 2,564,690.

Accordingly the relative proportions of the ingredients are substantially 10–30 parts fly ash and 2–10 parts lime (expressed as $Ca(OH)_2$) for each 70–90 parts of fine inert material. However, greater proportions of lime may be employed for some soils without excessive detrimental effect for the stabilization of highly plastic soils such as clays and the like although as lime content is increased the desirable characteristics of the composition are rapidly lost. Lime contents of 20% or above are to be avoided since the advantages of our invention are not realized. For certain A–7 soils and other highly plastic soils, lime contents up to 15 parts lime per 100 parts soil plus fly ash may be employed to advantage. Preferably, the lime content of the mix is within the range of 2–10% lime per 100 parts soil plus fly ash.

This invention is also applicable to compositions included in our co-pending patent application Serial No. 477,122, filed December 22, 1954, now U.S. Patent No. 2,815,294, issued December 3, 1957, consisting essentially of about 5% to about 25% by weight fly ash, about 35% to about 75% by weight plastic soil, about 20% to about 50% aggregate, the sum of the percentages of fly ash, soil and aggregate being substantially equal to 100%, and about 2% to about 9% lime, the percentage of lime being based on the total weight of fly ash, soil, and aggregate, said aggregate comprising a plurality of discrete particles which are substantially chemically inert with respect to fly ash and lime, and substantially insoluble in water, the majority of said particles ranging in size from about forty mesh to about one half inch.

Ingredients of our compositions may be initially prepared in any conventional manner, such as by simple mixing of the solid components, preferably in the presence of water. However the mixing is preferably carried into effect by breaking up the soil and mixing the soil with lime and fly ash in predetermined proportions, utilizing suitable soil-breaking and mixing equipment such as that conventionally used for farm and construction purposes, with water added to the mixture in an amount substantially equal to that proportion of water known and defined as the optimum moisture content. Optimum moisture content is determined by the well known modified Proctor test.

Optimum moisture content of a soil or stabilized soil mixture is that moisture content at which the soil-moisture mix has the maximum dry density, or maximum dry weight of solids per unit volume. In practice, the optimum water content varies with each particular soil and stabilized soil mixture, ordinarily within the range of 8–25% moisture by weight, based on the total dry weight of lime, fly ash, and soil. Preferably, in incorporating moisture into our stabilized soil mixes, the water content should be controlled within the range of 70%–130% of the optimum water content. Thus the water content of the stabilized road base may vary from about 5%–32% by weight, based on the weight of total lime, fly ash, and soil, for different soils.

After mixing, the treated soil is laid down in the desired location and compacted while unconfined, either as a single layer or, depending upon the depth, in several separate layers. Preferably the compacting is effected by moving a heavy roller along the surface of the stabilized soil while unconfined.

In practice, the initial preparation and compacting of the mixture may be carried out in a number of ways. For example, the lime and fly ash may be mixed with the soil in batch type mixing equipment. If desired, permanent or portable mixing plants may be set up either at a control point from which the composition is transported to the job or the mix plant may be placed directly at the job site depending on the condition existing for each construction project. Another acceptable practice involves the "mix-in-place" method where the lime and fly ash is placed on the road or construction area either directly over the existing soil or in conjunction with a soil brought in from a local gravel pit or the like. The lime and fly ash may be supplied in bulk form or if desired in paper or other containers. Regardless of the method used the proportioning of materials is preferably carried out so that the composition conforms quite closely to the optimum mixture established in the previously described tests of sample mixes.

Where the material is mixed in place, the use of a pulvi-mixer or similar road construction equipment will result in a thorough and rapid blending of the materials to a depth of 6" to 8". Usually where depths greater than 8" are desired the application and mixing process is preferably carried out in layers. The depth of material used will depend to a considerable extent on the service to which the base will be subjected and on the surface cover placed over the base.

The composition should preferably contain the proper amount of water to develop adequate density after compaction. Where the composition is prepared in a mixing plant the water may conveniently be added to the mixer. For the "mix-in-place" procedure the water may be applied either by means of watering tanks or by addition of water to one or more of the ingredients prior to mixing, regardless of the method of addition of water. It is usually essential to check the water content prior to compaction of the base. If the water concentration is not close enough to the optimum value, an adjustment should be made—either by blading or mixing material too high in moisture content or by addition of water for further mixing for material too low in water.

Compaction of the base is accomplished by using conventional grading and rolling equipment for some of the more plastic type soils. A sheeps foot roller may be used to advantage. Flat steel rollers or rubber wheeled rollers such as wobble wheel rollers may be also used to develop the desired compaction. Where possible the compaction should be checked in the field to determine whether or not the compaction of the base is adequate. Preferably the compaction should be quite close to the value of density established in the tests for optimum mixture as set forth above.

In accordance with this invention, the compacted composition is subjected to setting until a partial interaction takes place, producing a corresponding partial growth of its pozzolanic strength bonds. Preferably the mixture is subjected to natural ambient conditions for a period of about one week to about one year, but in any event for a time which is materially less than (preferably no more than one-half) the time required for the ultimately complete growth of the pozzolanic strength bonds (complete setting). The time required for complete setting varies according to prevailing conditions. For example, cold or freezing weather retards setting, as does poor drainage.

According to this invention, at or prior to the time when the mix attains a compressive strength of about one-half the compressive strength attainable after completion of the setting reaction in a single stage, the partially set mix is broken down into a plurality of separate and discrete particles (disintegrated), such separate and discrete particles are reshaped and recompacted in the presence of water. The recompaction step may be carried out in the same way as the initial compaction step heretofore described. The foregoing steps, comprising breaking down and re-shaping are referred to herein collectively as "reworking."

Accordingly, the multiple stage road building method involves the reaction of lime, fly ash and soil in at least two successive and related stages. In the first stage, a pozzolanic action begins, which involves the lime, fly ash and soil. This stage of the reaction includes a metamorphic change of state of soil components, changes of material grain size, density, water of immobility, and an alteration of the mineral placement. All of these changes are due to the interaction of lime, fly ash and soil, and they result in the formation of intermediates which are of particular advantage in connection with the reactions taking place in the second stage of the process.

In the second stage of the process, after the mix has been reworked and recompacted, the pozzolanic reaction involves the intermediates produced in the reaction of the first stage, together with residual lime and fly ash present in the mix. The residual lime and fly ash react far better and more rapidly with the intermediates produced from the first reaction stage, than they would have reacted had there been no reworking and recompacting. The reworking and recompacting steps cause a redistribution of the components of the mixture, allowing the residual lime and fly ash to react with the intermediate compounds produced in the first reaction stage.

In accordance with this invention, the setting reaction in the first reaction stage is carried out for a period of about one week to about one year, such period being limited as a maximum to the time required to produce a compressive strength of about one-half the compressive strength that would be produced after completion of the setting reaction in a single stage.

It has been discovered that the interaction of lime, fly ash and soil in the first reaction stage differs radically from the interaction which takes place in the second reaction stage. This fact has been demonstrated by observations of the amount of water of immobility associated with the particles of the mix, and by observations in connection with the mineral placement within the mix.

Referring to the matter of water of immobility, it is a known fact that the particles of the soil in the mix are associated with outer layers of immobile water, and the presence of this immobile water is evidenced by the behavior of the mix on settling. The "water of immobility" of the mix is expressed as a percentage, and is the ratio of the volume of immobile water to the total volume of immobile water plus solid particles. A typical reaction in accordance with this invention would show, for example, a water of immobility at the beginning of the first reaction stage on the order of about 90%, with a drop to a value as low as about 20–25% at the end of the first reaction stage. In the second reaction stage, the water of immobility drops very little, for example, from about 20% to about 15%. This indicates that a series of entirely different types of reactions are taking place during the second reaction stage as compared to the first reaction stage.

A similar observation may be made with respect to the mineral placement in the mix. As the mineral placement reaction between lime, fly ash and soil takes place, an ion exchange reaction occurs. For example, calcium and magnesium ions replace sodium and potassium originally present in the soil. Then, a supplementary reorientation occurs within the molecular structure, and this happens relatively slowly but has usually been found to take place in the time period referred to above in connection with water of immobility. A substantial mineral placement change occurs in the first reaction stage, as compared to the change occurring in the second reaction stage.

After the base has been finally compacted, a final surface treatment may be applied. In some instances no surface treatment may be necessary if the base is to serve in an application where severe traffic or climatic conditions are not anticipated. Usually some form of wearing or seal coat is applied to the compacted base. This may consist of a coating of oil or tar with or without additions of stone chips. The composition may also be placed directly under bituminous or Portland cement pavements or in some types of road construction may act as the sub-base under other base compositions such as water bound macadam and the like.

The compositions may also be added to larger size aggregates such as ballast road stone to bind the coarse aggregate together and thereby develop greater strength and improved stability in the base. Many variations of the above are possible.

The method used in the construction of the base requires essentially conventional road building equipment and therefore the invention may be practiced in both a convenient and economical manner.

The following examples are illustrative of the invention:

Example 1

A street was constructed for a development, utilizing a mixture consisting essentially by weight of about 5% lime, about 10% fly ash and the balance soil having a fineness modulus below 1.7. After suitably mixing the ingredients of the composition together with water, the road was compacted in an unconfined condition and was subjected to ambient conditions for a period of 6 months. After 6 months a sample was removed from the road and disintegrated, then recompacted and subjected to curing until it developed its final compressive strength. This produced a compressive strength of 1200 pounds per square inch. Another sample of the material which was used in building the road was taken and such sample was simply compacted and cured until it reached its final compressive strength. This produced a compressive strength of 758 pounds per square inch. The increase of compressive strength, from 758 to 1200 pounds per square inch, was caused by the disintegration and recompaction steps.

Example 2

Another housing development construction project involved the application of a lime-fly ash-soil composition, containing by weight about 5% lime, about 10% fly ash, and the balance soil having a fineness modulus below 1.7. A procedure the same as that detailed in Example 1 above, was followed. The final (completely cured) compressive strength of the sample which was not recompacted was 700 pounds per square inch, while a sample which was recompacted after being subjected to natural ambient conditions for a period of 2 months, was found to have a final (completely cured) compressive strength of 1180 pounds per square inch. Again, the increase of compressive strength was caused by the two-stage process involving breaking up the mix and recompacting it.

Example 3

A base was laid for a storage area at a large refinery. The project consisted of a road supporting base consisting of about 5% by weight lime, about 10% by weight fly ash, and about 85% by weight of A-2-4 soil having a fineness modulus below 1.7. At the time the base was prepared and compacted, representative samples of the mixture were taken and these were compacted in the laboratory under controlled conditions accurately representative of the conditions in the field. The final compressive strength measured 452 pounds per square inch. After the base had been subjected to natural ambient conditions in the field for a period of 1 month, a sample of the base was taken and was disintegrated and recompacted and tested for its final compressive strength. Such disintegration was accomplished as follows: the sample of base was broken down, according to standard procedures for preparing soil samples, to a point where it substantially met the gradation of the original soil used for construction of the base. The test after recompacting was conducted under the same conditions as the test without recompacting and indicated an improvement of final compressive strength from 452 pounds per square inch to 570 pounds per square inch.

One of the important advantages of our invention is that it provides a new concept in road building in which the road is initially installed in a temporary way in rough condition for immediate use as a construction road (usable even while installing it) and then at some convenient later period it is reworked and recompacted in final form, to result in a road of ultimately higher strength than if not reworked and recompacted.

It is within the scope of this invention to stop the interaction of lime, fly ash and soil at the end of the first reaction stage by disintegrating the mix while in a dry condition. The mix, in this condition, can readily be removed and redeposited at any other location, and recompacted in the presence of moisture.

Additional materials such as Portland cement, special grades of clay soils and alumina silicates and the like may be incorporated into soil stabilized in accordance with our invention without detrimental effect to certain of the advantages of the invention. However, the novel stabilized soil road bases themselves consist essentially of the ingredients set forth in the appended claims.

Although in the specification and claims we refer to a method of building a road, it will be appreciated that the term "road" is used in its broad sense and is intended to include load-supporting bases such as roadways, secondary roads, road shoulders, highways, parking areas, airport runways, floors, load-supporting bases and the like.

The above description and examples are presented as illustrations of preferred embodiments of the invention. All modifications and variations which conform to the spirit of the invention, including the substitution of equivalents and other changes in the particular form of the method and product, as well as the use of certain advantageous features of the invention without the use of other features, are within the scope of the invention as defined in the appended claims.

Having thus described our invention, we claim:

1. In a method of building a road of a slow-setting composition consisting essentially of about 10%–30% by weight crude fly ash, about 70%–90% by weight soil having a fineness modulus below 1.7, the sum of the percentages of soil plus fly ash being substantially equal to 100, and about 2% to about 9% by weight inclusive of lime, said composition having an early bearing strength which is greater than the bearing strength of the soil, the steps which comprise mixing said lime, crude fly ash and water with the soil in relative quantities forming said composition, compacting said composition, subjecting said compacted composition to conditions within the range of natural ambient conditions for a limited period of time of about a week to a year until partial setting of said composition occurs and the bearing strength of the composition is substantially increased, disintegrating and remixing the partially-set composition and distributing it along a predetermined road course, recompacting said partially-set composition in situ, and then subjecting said compacted partially-set composition to natural ambient conditions for a suitable time until reaction of said lime, fly ash and soil is complete.

2. In a method of building a road of a slow-setting composition consisting essentially of about 10%–30% by weight crude fly ash, about 70%–90% by weight soil having a fineness modulus below 1.7, the sum of the percentages of soil plus fly ash being substantially equal to 100, and about 2% to about 9% by weight inclusive of lime, said composition having an early bearing strength which is much greater than the bearing strength of the soil, the steps which comprise loosening the soil along a predetermined course, mixing said lime, crude fly ash and water with the soil in relative quantities forming said composition, compacting said composition, subjecting the compacted composition to natural ambient conditions for a limited period of time of about a week to a year until substantial partial setting of said composition occurs and the bearing strength of the composition is increased while said composition is in a re-workable condition, loosening the partially-set compacted composition before said setting is complete, disintegrating and remixing the loosened partially-set composition, and then subjecting said re-compacted partially-set composition to natural ambient conditions for an extended period of time until reaction of said lime, fly ash and soil is complete.

3. The method defined in claim 2, wherein the original mix is compacted in an unconfined condition, by downwardly directed pressure only.

4. In a method of building a road of a composition consisting essentially of about 10%–30% by weight fly ash, about 70–90% by weight soil having a fineness modulus below 1.7, the sum of the percentages of soil plus fly ash being substantially equal to 100, and about 2% to about 9% by weight inclusive of lime, and wherein said lime, fly ash and soil are compacted in the presence of moisture causing an interaction which develops strength bonds and ultimately produces a hard material when subjected to natural ambient conditions, the novel step which comprises interrupting said interaction by disintegrating the mix within a period of about a week to about a year after said compaction, such period being limited as a maximum to the time required to produce a compressive strength of about one-half the compressive strength that would be produced after completion of said interaction, and such disintegration being followed by reshaping and recompacting the mix in the presence of moisture.

5. The method defined in claim 4, wherein the partially-set material, after having been disintegrated, is re-shaped and re-compacted in the presence of moisture and subjected to natural ambient conditions until said interaction is completed.

6. A two-stage method of building a road of a slow-setting composition consisting essentially of about 10%–30% by weight fly ash, about 70%–90% by weight soil having a fineness modulus below 1.7, the sum of the percentages of soil plus fly ash being substantially equal to 100, and about 2% to about 9% by weight inclusive of lime, said composition having an early bearing strength which is greater than the bearing strength of the soil, the steps which comprise mixing said lime, fly ash and water with the soil in relative quantities forming said composition, commencing the first-setting stage by compacting said composition in the presence of moisture, subjecting said compacted composition to conditions within the range of natural ambient conditions for a limited period of time until partial setting of said composition occurs and the bearing strength of the composition is substantially increased, terminating the first stage of said setting by disintegrating the partially-set mix into a plurality of separate and discrete particles within a period of about a week to about a year after said compaction, such period being limited as a maximum to the time required to produce a compressive strength of about one-half the compressive strength that would be produced after completion of said setting, re-shaping the disintegrated mix, then commencing the second setting stage by re-compacting the disintegrated re-shaped mix in the presence of moisture, and subjecting the resulting mix to natural ambient conditions until the setting reaction between said lime, fly ash and soil is complete.

References Cited in the file of this patent
UNITED STATES PATENTS
2,698,252  Havelin _____ Dec. 28, 1954